(12) United States Patent
Smith et al.

(10) Patent No.: US 11,381,639 B1
(45) Date of Patent: *Jul. 5, 2022

(54) LOAD BALANCING TECHNIQUE SELECTION BASED ON ESTIMATED LOAD

(71) Applicant: Amazon Technologies, Inc., Seattle, WA (US)

(72) Inventors: Terence Smith, Seattle, WA (US); Paul Derek DeMarco, Marathon, FL (US); Michael Shane Thyssen, Seattle, WA (US); Christopher Keakini Kaulia, Seattle, WA (US); Chaitanya Avinash Kulkarni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/892,113

(22) Filed: Jun. 3, 2020

(51) Int. Cl.
*H04L 67/1001* (2022.01)
*H04L 47/125* (2022.01)

(52) U.S. Cl.
CPC ........ *H04L 67/1002* (2013.01); *H04L 47/125* (2013.01)

(58) Field of Classification Search
CPC .......................... H04L 67/1002; H04L 47/125
See application file for complete search history.

(56) References Cited

U.S. PATENT DOCUMENTS

| | | | |
|---|---|---|---|
| 8,850,002 B1 * | 9/2014 | Dickinson | H04L 67/1002 709/224 |
| 9,300,728 B1 * | 3/2016 | Ananchaperumal | H04L 47/783 |
| 9,432,245 B1 * | 8/2016 | Sorenson, III | H04L 47/125 |
| 9,432,305 B1 * | 8/2016 | Das | H04L 67/1002 |
| 9,559,961 B1 | 1/2017 | Sorenson, III et al. | |
| 10,104,169 B1 * | 10/2018 | Moniz | H04L 67/1002 |
| 10,530,845 B1 | 1/2020 | Golden | |
| 10,542,078 B1 * | 1/2020 | Farrugia | H04L 67/1008 |
| 10,757,176 B1 | 8/2020 | Petit-Huguenin et al. | |

(Continued)

OTHER PUBLICATIONS

AWS, "AWS App Mesh", Retrieved from https://aws.amazon.com/app-mesh/ on Jun. 2, 2020, pp. 1-11.

(Continued)

*Primary Examiner* — Michael A Keller
*Assistant Examiner* — Jsing Forng Lin
(74) *Attorney, Agent, or Firm* — Robert C. Kowert; Kowert, Hood, Munyon, Rankin & Goetzel, P.C.

(57) ABSTRACT

Request routing in a network of computing devices. Back-end nodes associated with a request router send load reports to request routers. To select a back-end node for processing a request, a request router determines, based on the reports, estimated loads and corresponding errors of the estimated loads for respective nodes. A load balancing technique may be selected, based on the estimated loads and corresponding errors (e.g., round robin may be selected if the significance of an average error outweighs the difference between estimated load values for the nodes, or least estimated load may be selected of the difference between load values is greater than the average error). The selected technique is applied to choose one of the nodes to process the request. Load probability distribution may also be used for request routing, in combination with or separate from the selection based on the estimated loads.

20 Claims, 12 Drawing Sheets

(56) References Cited

U.S. PATENT DOCUMENTS

| | | |
|---|---|---|
| 11,032,361 B1 | 6/2021 | Chen et al. |
| 2002/0032777 A1* | 3/2002 | Kawata ............... H04L 67/1008 709/226 |
| 2004/0111509 A1* | 6/2004 | Eilam ................ H04L 67/1029 709/224 |
| 2006/0218279 A1* | 9/2006 | Yamaguchi ......... H04L 67/1002 709/226 |
| 2013/0080517 A1 | 3/2013 | T'Syen et al. |
| 2015/0236959 A1 | 8/2015 | Cai et al. |
| 2015/0381413 A1* | 12/2015 | Word ................. H04L 41/0806 709/220 |
| 2016/0309528 A1 | 10/2016 | Nishiguchi |
| 2018/0359788 A1 | 12/2018 | Abedini et al. |
| 2020/0050485 A1 | 2/2020 | Anderson et al. |
| 2020/0133220 A1 | 4/2020 | Anichkov et al. |

OTHER PUBLICATIONS

Michael Mitzenmacher, et al., "The Power of Two Random Choices: A Survey of Techniques and Results", Combinatorial Optimization 9, 2001, pp. 1-60.
U.S. Appl. No. 16/892,118, filed Jun. 3, 2020, Terence Smith, et al.

* cited by examiner

| | N1 | N2 | N3 | | N4 | N5 | N6 |
|---|---|---|---|---|---|---|---|
| Est. Load | | 35.9 | 38 | | 37 | 39.5 | |
| Error | | 2.1 | 2.3 | | 1.2 | 1.2 | |
| Load Diff. | | 2.1 | | | 2.5 | | |
| Error Threshold | | 2.2 | | | 1.2 | | |

Load difference < error threshold, so select node using round robin technique

Load difference > error threshold, so select node using least load technique

Select the back-end node with the least value of the determined randomized load values for the group.

US 11,381,639 B1

LOAD BALANCING TECHNIQUE SELECTION BASED ON ESTIMATED LOAD

BACKGROUND

Some load balancers manage load across a fleet of servers by routing requests to a server that is currently serving the smallest number of requests (e.g., least-request load balancers). Various types of system architectures have trouble implementing load balancing based on knowledge of the current loads at the servers because performance data regarding the load may be incomplete or delayed (e.g., architectures using non-proxy-based load balancers, architectures that place lower importance on transmitting timely server performance reports, etc.). The incomplete or delayed performance data may lead to too many requests being sent to some servers. For some systems, routing request volume is so great that the servers' capacities to service the requests changes in a volatile manner in-between performance reports from the servers, again leading to too many requests being sent to some servers and not enough request being sent to other servers.

Figure 1:
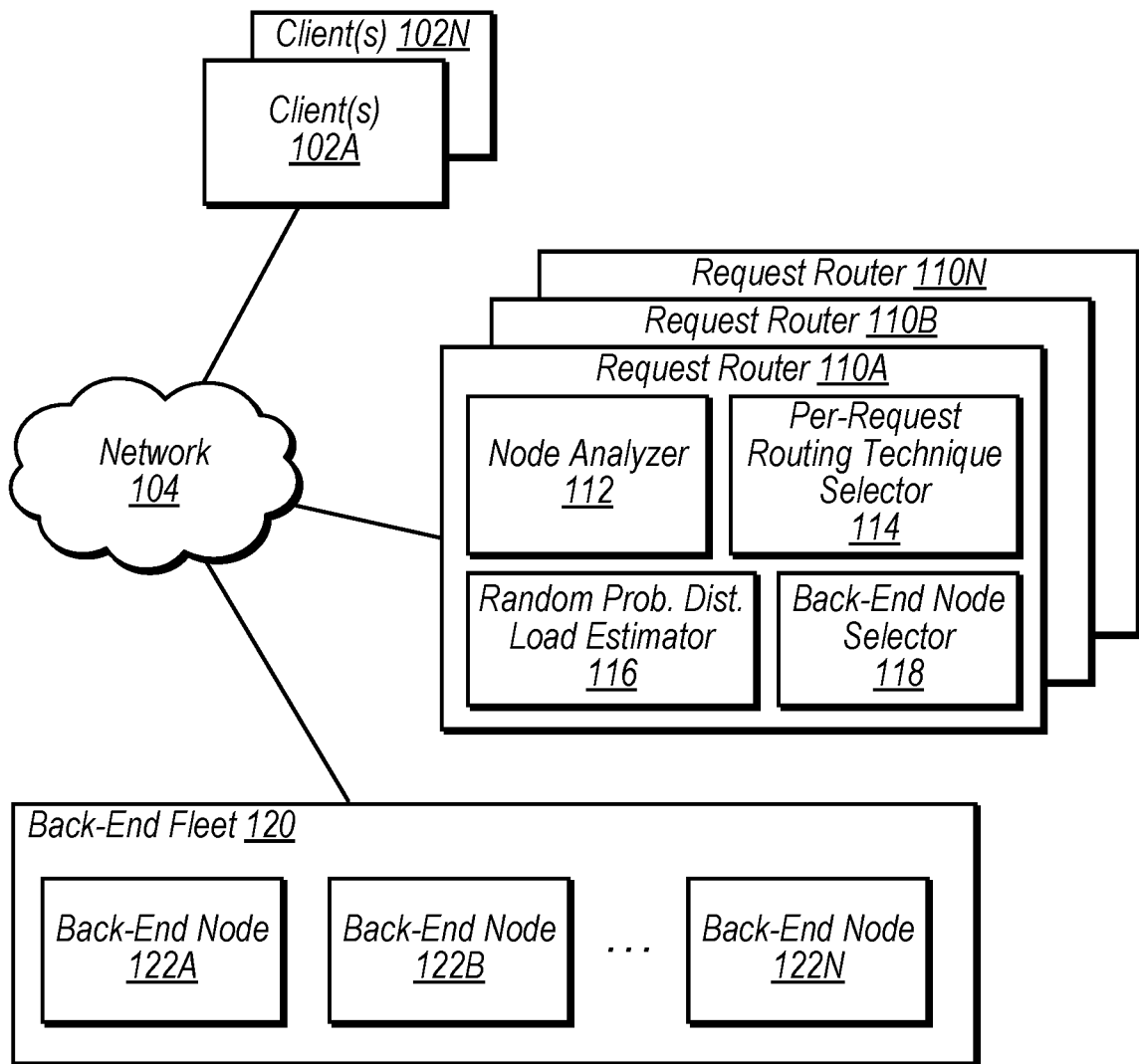
FIG. 1 is a block diagram of an architecture for a system that implements statistical approaches to request routing, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and devices base routing decisions on observed volatility of load information from back-end nodes. One statistical approach employs estimates of back-end node load to decide which request routing technique to use to select a back-end node for processing a request, while another approach employs random selection of a load value from probability distributions of nodal loads and selection of the node with the least (randomized) load value. The approaches may be combined, in embodiments. For example, when least requests (sometimes referred to as least load) is used as the routing technique to select a back-end node for processing the request, the load values for each back-end node may be determined according to the probability distributions of nodal loads for each node.

In embodiments, one or more networks connect request-making clients, request-directing request routers, and request processing back-end nodes. Generally, a request router receives a request (or an indication of a request) from a client, performs statistical calculations based on reports from the back-end nodes, and selects, based on the statistical calculations, a back-end node to process the request, or a technique for selecting a back-end node. Disclosed techniques may be performed in proxy-based and non-proxy-based architectures, in embodiments.

In one example, a routing request is received at a request router and the request is for a routing decision. For each available back-end node that the request may be routed to, the request router may generate a random request count based on a probability distribution of request counts for that back-end node. The request router can then select the back-end node with the lowest request count, and send the request to it. Variations to this approach may only consider a subset of back-end nodes, or rank the request counts to each back-end node based on open connections from the client, or distance within the network from the client, as a non-exhaustive list of examples.

In another example, a request router receives an indication of a request, selects a group of nodes from the back-end nodes available to the router, and determines an estimated current load and corresponding error of the estimated current load for nodes in the group. Any of several different load balancing techniques may be applied based on the estimated loads and corresponding error(s). For example, a least estimated load (sometimes referred to as least requests) technique may be selected when a difference between estimated load values for the group of nodes outweighs the error, and a round robin technique may be applied when a difference between estimated load values for the group of nodes is outweighed by the error. In some embodiments, various parts of the techniques may be mixed and matched. For example, if the least estimated load technique is selected, the system may employ selection of the node with the least load value from among the group, the least load of the group determined by a randomized selection from among a load probability distribution for each back-end node of the group.

Factors, such as but not limited to, requests that have been sent subsequent to the last report, characteristics of requests sent subsequent to the last report, a volatility of load reported by the corresponding back-end node, a load history for the corresponding back-end node, latency of received load reports for the corresponding back-end node, or a period of time between received load reports for the corresponding back-end node, may be used by the request router to produce and/or update a probability distribution describing the possible range of request counts on the back-end node (e.g., a Gaussian distribution or a more complex machine learning model).

In some embodiments, other factors, such as, but not limited to network locality of a client to a back-end node (or partition), and a client's existing open connection(s) with back-end node(s) may be used in determining an overall routing decision. For example, such factors may be used in selecting a group to which a load balancing technique is applied (e.g., FIG. 3, block 304, described below) or otherwise.

The following load report process may take place at the request router asynchronously to the above request routing processes, in embodiments. A request router may receive a performance report (also referred to as a load report, herein) from a back-end node for a reported time. The request router estimates current load for that back-end node at that time, determines an error between the reported load value and the currently-generated estimate of the load and updates a stored value of the estimated error. In embodiments, the request router compares the reported load to the generated estimated load to update the load estimate error (e.g., root mean squared error, of the like) for that back-end node. Other factors may be considered when estimating the current load, such as but not limited to, an error between the estimated and reported load values, a load history for the corresponding back-end node, the number of new requests the request router has sent to the back-end node, an amount of time passed since the request count was reported, and estimated drain at the back-end node since that last report time and/or a volatility of load reported by the corresponding back-end node, etc. See FIG. 7B as an example.

A partition-level routing determination may occur prior to the above concepts where the request routers share partition-level load information and a given request router with a high partition-level load may send a request routing inquiry to a request router with a lower partition-level load.

For instance, request routers receive performance reports from the back-end nodes reporting data such as a measurement of load at the back-end node at a point in time. Data from the reports may be used in the statistical analysis described herein. Request routers may aggregate the data from the reports, producing router-level load information.

For example, in some system architectures, each request router may be assigned a partition encompassing a subset of a fleet of back-end nodes. Assigned nodes of that partition transmit reports to the respective request router and the router aggregates the data from the reports into partition-level node performance information. Partition-level performance information (e.g., partition-level load information) may be used by the request router to determine whether to perform the routing locally, or to instead send the routing decision out to a different request router. The load information from the back-end nodes may be statistically analyzed, by the request routers, and used to either directly choose a node for processing a request, or used to select a particular technique to apply in order to choose a node for processing the request. Request routers may exchange and update partition-level load information about one-another, in embodiments. Exchanged partition-level load information may be used by request routers to update partition-level load thresholds, in embodiments.

In one example, as factors indicate increasing uncertainty about the actual current load at a back-end node, the routing logic is more likely to make routing decisions based on round robin less likely to make routing decisions based on least requests.

Example benefits of some of these approaches over other approaches (such as the pick-2 algorithm, for example) is that the request router directly observes the reliability of the router's own load information based on successive reports from the request router, and is able to adjust the degree of randomness imparted on the request counts based on that reliability.

Some embodiments may solely use deterministic techniques and other embodiments may solely use random-selection techniques to make routing decisions (either directly selecting an end-node or selecting a technique to apply to select an end node). In some embodiments, illustrated systems may implement techniques described herein that are a combination of random and deterministic techniques that are applied at the granularity of individual request-level routing decisions. For instance, in some embodiments, using the techniques described herein, the request router may toggle back and forth between applying random and deterministic techniques for individual requests. A benefit, for some embodiments, is that the system may be less likely to apply a deterministic technique when the likelihood of error is high (thus increasing a chance of making a poor routing decision), yet still benefit from deterministic techniques when the likelihood of error is relatively lower, all at the granularity of a request-by-request basis; a balance of the tradeoffs for each type of technique. Such embodiments (e.g., sometimes referred to as hybrids of proxy and non-proxy routers herein) may result in an improved balance of cost, availability and scale associated with using non-proxy routers/load balancers, while still obtaining the higher-quality routing decisions of a proxy-based router/load balancer.

Also, because in at least some embodiments, each routing decision is made on the basis of a discrete, fully orderable estimate of the request count on each back-end node, it may be easier to integrate other non-load-based factors such as connection concentration and network distance, etc., without limitation.

It is contemplated that the system architectures and techniques described herein may be implemented in a cloud-computing environment. For example, the request routers and back-end nodes may be hosted by computing devices or compute instances of a service provider that provides services to clients via external networks. In some embodiment, request-making clients may be external to the service provider (e.g., processes, applications, or devices external to the service provider may be clients that make requests). In some embodiment, request-making clients may be internal to the service provider (e.g., processes, applications, or devices internal to the service provider may be clients that make routing requests). Blended architectures of the two options are also contemplated.

Illustrated in the FIGS. 1-12 are block diagrams of system architectures (FIGS. 1, 9, 11, 12), data flows (FIGS. 2, 4A, 6A, 7A, 8 and 10A), and data tables (4B, 6B) that support implementation of various statistical approaches to request routing (FIGS. 3, 5, 7B, 10B, 10C). Generally, the statistical approaches to request routing (FIGS. 3, 5, 7B, 10B, 10C) are performed by request routers depicted in the system architectures depicted in FIGS. 1, 11 and 12, as well as in data flows (FIGS. 2, 4A, 6A, 7A, 8 and 10A), and data tables (4B, 6B) to route requests to be processed by back-end nodes depicted in FIGS. 1, 11 and 12, as well as in data flows (FIGS. 2, 4A, 6A, 7A, 8 and 10A), and data tables (4B, 6B). It is contemplated that at least some functionality illustrated in FIGS. 3, 5, 7B, 10B, 10C may be performed by other components depicted in architectural FIGS. 1, 11 and 12, as well as in data flow FIGS. 2, 4A, 6A, 7A, 8 and 10A, in embodiments (e.g., it is contemplated that back-end nodes in any of the Figures could pre-process some of the load data prior to reporting it to the request routers).

FIG. 1 is a block diagram of an architecture for a system that implements a statistical approach to request routing, according to at least some embodiments. Illustrated network 104 connects clients 102A-N, request routers 110A-N, and a back-end fleet 120 of back-end nodes 122A-N. Illustrated request routers 110A-N make routing decisions for routing requests from clients 102A-N to the back-end nodes 122A-N. FIGS. 3-12 illustrate various example architectures, techniques and data flows that may be implemented by the system illustrated in FIG. 1.

Request routers 110A-N are illustrated with node analyzer 112, pre-request routing technique selector 114, random probability distribution load estimator 116 and back-end node selector 118. In embodiments, node analyzer 112 may analyze load information received from the back-end nodes in the form of load reports, illustrated in FIGS. 7A-B and 10A-C, described below. Per-request routing technique selector 114 may determine, for respective routing requests, a particular routing technique to apply (e.g., FIGS. 3, 4A-B, describe below) and back-end node selector 118 may apply a particular technique to select a particular back-end node to process the request (e.g., FIGS. 3, 4A-B, 5, 6A-B, described below).

Figure 2:
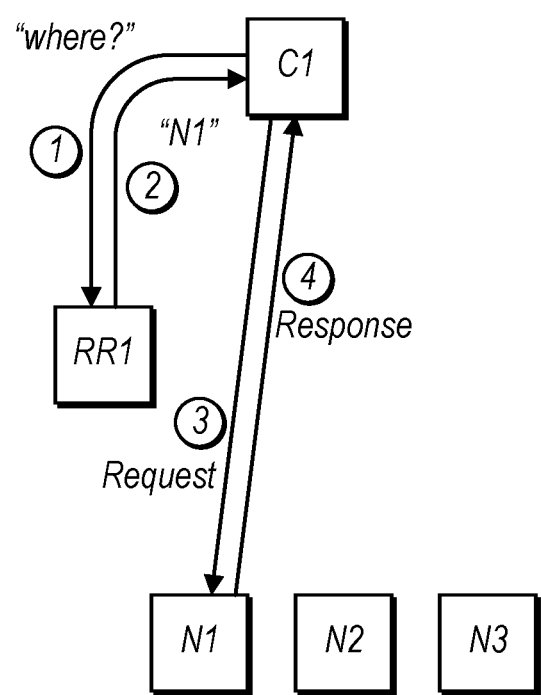
FIG. 2 illustrates a data flow diagram for a system that implements statistical approaches to request routing, according to at least some embodiments.

FIG. 2 illustrates a data flow diagram for a system that implements a statistical approach to request routing, according to at least some embodiments. FIG. 2 illustrates a non-proxy routing architecture where, at ("1") client C1 sends a routing request to request router RR1 asking where to send a request to be processed by a back-end node. At request router RR1 identifies a router to process the request (e.g., as illustrated in FIGS. 3A-B, 4A-B, 5, 6A-B) and responds at ("2") to the client C1 with the identified back-end node N1. The client C1 sends, at ("3") the request to back-end node N1 to be processed. N1 processes the request and, at ("4") responds back to client C1 with the response to the processing request.

Figure 3:
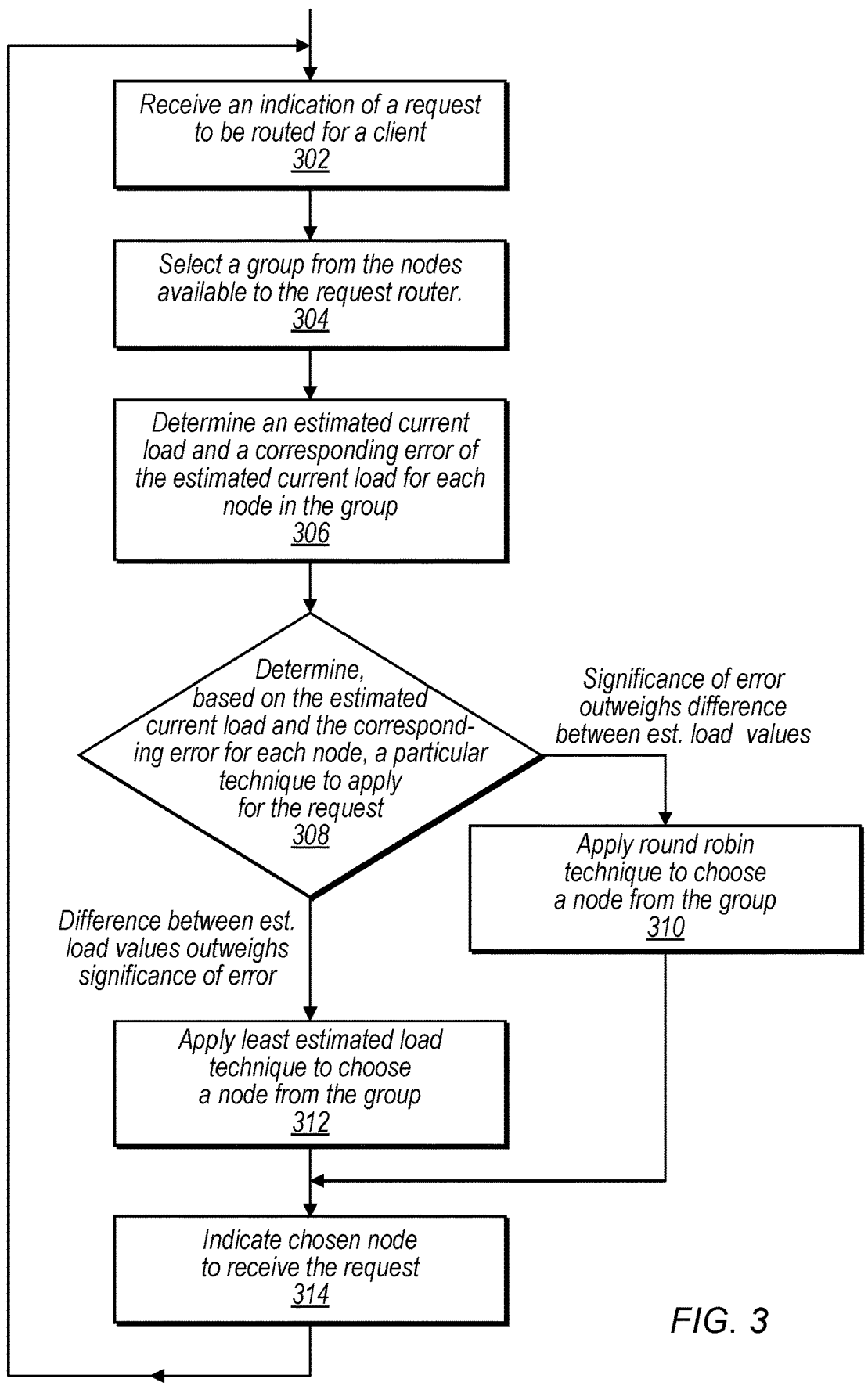
FIG. 3 is a process flow diagram for a system that implements statistical approaches to selecting a technique for routing requests, according to at least some embodiments.

FIG. 3 is a process flow diagram for a system that implements statistical approaches to selecting a technique for routing requests, according to at least some embodiments. The illustrated process describes a technique for selecting either a round robin or least load (sometimes referred to as least requests, herein) routing technique (sometimes referred to as a load balancing technique) for making routing decisions on a per-request basis, and may be performed by the request routers illustrated and described throughout this disclosure.

At block 302, an indication of a request to be routed for a client is received. For example, request router 110A may receive a processing request or a routing request from client 102A. In some embodiments, the indication of the request may be the request itself (e.g., a request to be processed by the back-end node selected to process the request). In embodiments, the indication of the request may be a routing request for routing the request to be processed and the client may receive back an indication of the selected back-end node and send the request to be process to the selected back-end node for processing. At block 304, a group from the nodes available to the request router are selected. For example, request router 110A may select a group of nodes from the back-end fleet 120. Selection may be performed randomly and/or may be based on any of a number of factors including, but not limited to, load-level, membership in a partition, network distance between the client and back-end node, existing open connections between the client and back-end nodes, etc.

Figures 7A, 7B:
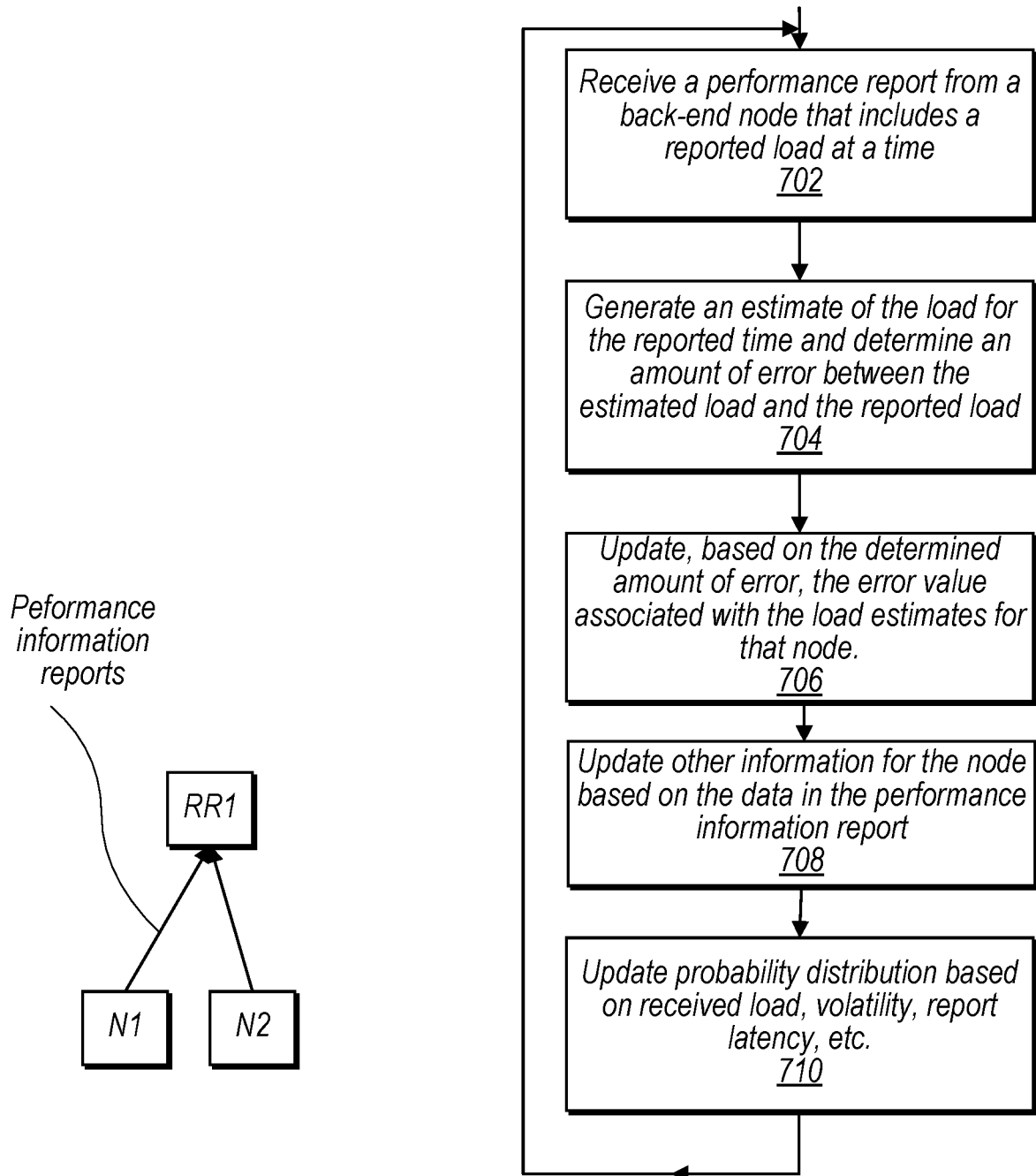
FIG. 7A is a data flow diagram for load information reports for a system that implements statistical approaches to request routing, in at least some embodiments.
FIG. 7B is a process flow diagram for updating performance information for a system that implements statistical approaches to request routing, in at least some embodiments.

At block 306, an estimated current load and a corresponding error of the estimated current load is determined for each node in the group. To be clear, this is not the same estimated load generated in block 704, of FIG. 7B, described below. The estimated load generated in block 306 is generated in response to, and for, a particular routing request; it is an estimate of the routing load at the time of the routing request, for example. In contrast, the estimated load generated in block 704 of FIG. 7B is generated in response to receipt of a load report from a back-end node, in order to determine a new error value; it is an estimate of the routing load at the time of the measurement indicated in the load report, in at least the illustrated embodiments.

In embodiments, estimated load is determined based on the reported load at the last update plus an estimated change based on time passing. Estimated load may also be determined based on other factors, including, but not limited to, factors based on the load data in the report such as the reported load, load history for the node, load volatility, and/or an error between estimated and reported load values, factors based on characteristics of the report such as delay associated with a next report, and factors based on the estimated load of the back-end node such as estimated drain since the report time, and factors based on interactions between the request router and the back-end node such as the number of new requests sent from request router to back-end node since report time, etc.

In some embodiments, an estimated load for one particular instance of a type of back-end node (or type of process running thereon, etc.) may be used as the estimated load for other nodes of the same type (e.g., without measuring or performing a calculation of the estimated load for each one of the other nodes).

In some embodiments, a probability distribution (e.g., described below) is used to estimate the load at routing decisions. In some embodiments, the calculated probability distribution for one particular instance of a type of back-end node (or type of process running thereon, etc.) may be used as the probability distribution for other nodes of the same type (e.g., without measuring or performing a calculation of the probability distribution for each one of the other nodes).

In some embodiments, a probability distribution (e.g., described below) is not used to estimate the load at each routing decision. For instance, the request router 110A may instead include logic that makes the following determinations: if the individual estimated loads of back-end node 1 and 2 are closer than the historical errors of the estimated loads of back-end nodes 1 and 2 (the errors added together or averaged, or the like) then select a back-end node using the round robin technique, otherwise, pick the lower estimated load. In embodiments, this transitions between least requests and round robin on a per-decision (e.g., per-routing request) basis. In some instances, there may be a fuzzy zone around the estimated load based on past error. The router may be regularly in that fuzzy zone or regularly out of the fuzzy zone, or regularly transitioning in/out of the fuzzy zone. Logic in the request router may apply the rates of being in/out of the fuzzy zone or transitioning in/out of the fuzzy zone to define aggregate behavior of least-requests and round robin, in embodiments.

A stored error that corresponds to the load estimate may be determined when a load report is received (e.g., FIGS. 7A-B, 10A-B, described below). For example, request router 110A may compare the load the back-end node reports to the router's same-time estimate (the same time being the time of the reported load in the load report, for example) of that back-end node's load, and for each back-end node, keep a running average of the absolute value of the difference between those two (e.g., an exponentially weighted moving average).

In some embodiments, a known or currently-measured error associated with one particular instance of a type of back-end node (or type of process running thereon, etc.) may be used as the error for other nodes of the same type (e.g., without measuring or performing a calculation of the error for each one of the other nodes).

A particular routing technique is determined based on the estimated current load and the corresponding error for each node (block 308). In embodiments, an average error for the selected group may be used in making the determination or the request router may perform pair-wise comparisons of the errors of each node in the group, for example. Some embodiments may implement a weighted running average of absolute values of differences between reported loads and corresponding estimated loads for the individual back-end node.

In some embodiments, as time moves on and a load report has not been received, the likelihood or amount of error may grow larger. In some embodiments, an estimated amount of error may be calculated based on the amount of time that has past, as well as based on other factors described herein, as appropriate, and the estimated amount of error may be used, along with other factors, to determine the particular technique to apply.

Any of various routing techniques may be selected without departing from the scope of this disclosure; the illustrated example decides between round robin and least load.

Some techniques implemented by routers may include selecting from among classes of load balancing techniques. For instance, if logic in the router determines that the error is weightier than a difference between the loads for the back-end nodes (if the load estimate is determined to be likely non-representative of the actual load), the request router may apply or select an unbiased-type of selection technique, such as a random-selection technique or round robin technique. If the logic determines that a difference between the loads is weightier than the error for the back-end nodes (if the load estimate is determined likely to be representative of the actual load) the request router may apply or select a biased-type of selection technique, such as least-load. Such logic may have the benefit of avoiding bias in a wrong direction, in embodiments. In the illustrated example, for the case where program logic determines a significance of the error outweighs the difference between the estimated load values (see FIG. 4B, left side) the round robin technique is applied to choose one of the back-end nodes from the group (block 310). For the case where the difference between the estimated load values outweighs the significance of the error (FIG. 4B, right side), the least estimated load technique is applied to choose a back-end node from the group (block 312).

A non-exhaustive list of other factors that may be taken into account in the routing decisions, includes but is not limited to, traits of the request such as network locality of the client to a back-end node (or partition), the client identity, the API used to make the request, the building housing the device that is the source of the request, regional information about the source of the request, the type of client making the request, and which back-end node(s) the client already has open connection(s) with, etc. Some such examples of other factors may be grouped as metadata that is received along with the request, or information otherwise known or determined based on the request.

For example, in embodiments, the error compensation (e.g., either how the error is determined, or determining a weight to assign to the error vs the load difference to decide the particular load balance technique type to use) may be adjusted based on one or more factors such as those provided as examples, above. Logic in the request router may compensate for error based on traits of the request, such as those listed above, for example.

In either case (round robin or least estimated load) the chosen node is indicated to receive the request (block 314). For example, the request router 110A may indicate the chosen back-end node to the client (for the client to send the processing request to the chosen node) or may forward the received processing request directly to the chosen back-end node.

Figures 4A, 4B:
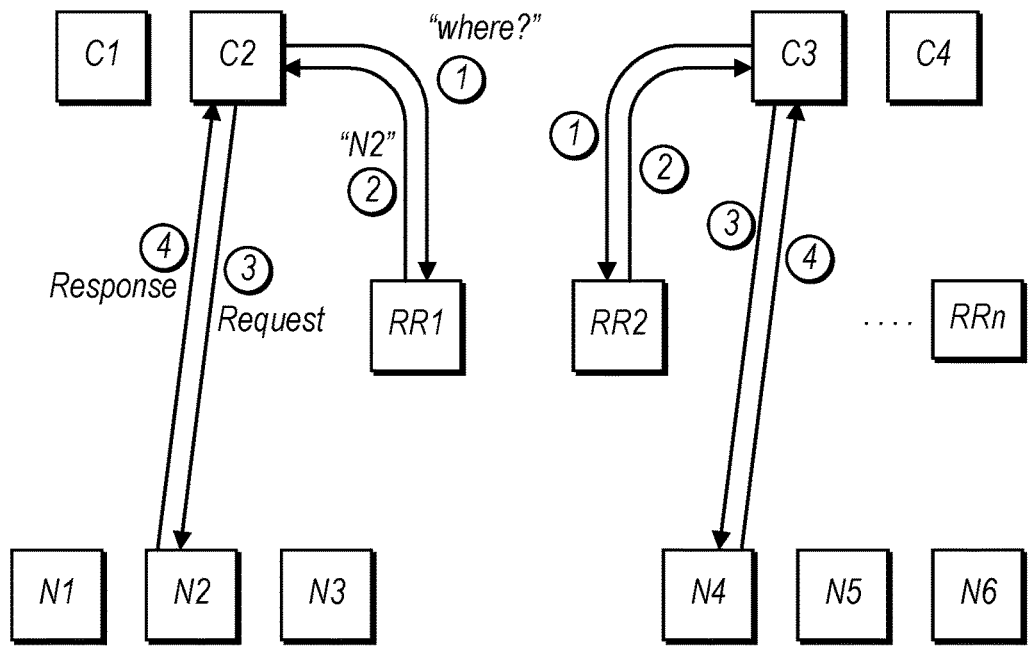
FIG. 4A is a data flow diagram for a system that implements statistical approaches to selecting a request routing technique, according to at least some embodiments.
FIG. 4B is a table of data for a system that implements statistical approaches to selecting a request routing technique, according to at least some embodiments.

FIG. 4A is a data flow diagram for a system that implements a statistical approach to selecting a request routing technique, according to at least some embodiments. In the illustrated embodiment, clients C1-C4, request routers RR1-RRn and back-end nodes N1-N6 are illustrated, and ("1")-("4") correspond to similar features described above for FIG. 2 and illustrate routing, by the request routers RR1, RR2 of requests from clients to the back-end nodes in accordance with the technique illustrated in FIG. 3.

FIG. 4B is a table of data for a system that implements statistical approaches to selecting a request routing technique, according to at least some embodiments. The data on the left side of the table corresponds to the data flow on the left side of FIG. 4A and the right side of the table corresponds to the data flow on the right side of FIG. 4A. In particular, the data illustrated on the left side of FIG. 4B is data used by RR1 in FIG. 4A to make a routing decision in response to request ("1"). On the left side, to make the routing decision, request router RR1 selected a group of back-end nodes (N2, N3) from the available back-end nodes (N1-N3), and generated estimates of the current loads for each node in the group (35.9 for N2, 38 for N3). In the illustrated embodiment, a difference between the load values (e.g., 38−35.9=2.1) as well as an error corresponding to each of the estimated loads are used to select a technique for choosing a back-end node to process the request.

For example, the request router RR1 may determine a difference between the respective determined estimated loads for N2 and N3, and determine an error threshold based on the corresponding errors for the individual estimated loads for N2 and N3. On the left side of FIG. 4B, Router RR1 determines to apply the round robin technique when the determined difference between the individual estimated loads for N2 and N3 is less than the determined error threshold. On the right-hand side of FIG. 4B, request router RR2 determines to apply the least load technique when the determined difference between the individual estimated loads is greater than the error threshold determined for the back-end nodes N4 and N5 of that group. An error threshold may be determined any of various ways, such as but not limited to, an average of the errors, a difference between the errors, a sum of the errors, a running average of the absolute value of the difference between the errors (e.g., using an exponentially weighted moving average, or the like, etc.), etc.

Figure 5:
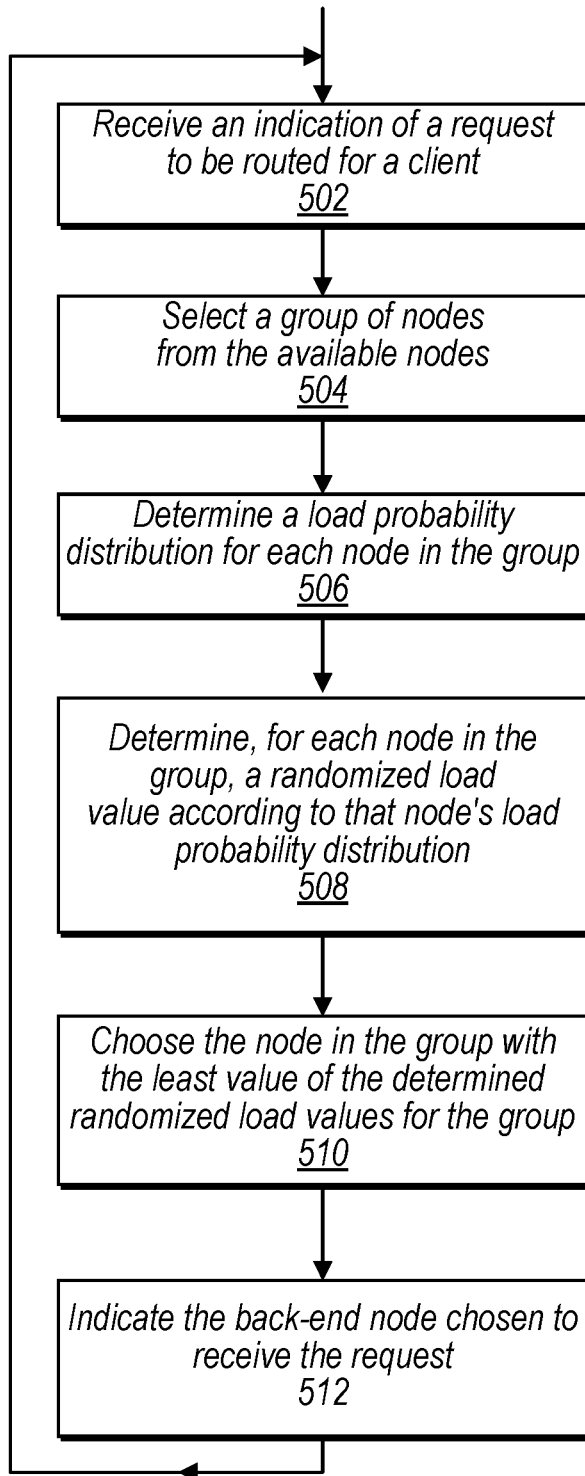
FIG. 5 is a process flow diagram for a system that implements statistical approaches to request routing, according to at least some embodiments.

FIG. 5 is a process flow diagram for a system that implements a statistical approach to request routing, according to at least some embodiments. Disclosed is a probabilistic distribution-based technique for choosing a back-end node to process a request. The selection from the probabilistic distribution may be a random selection, in some embodiments. In embodiments, some or all of the probabilistic distribution-based selection technique may be applied at other points in the routing process described herein. For example, for the embodiment illustrated in FIG. 5, probabilistic distribution-based technique for choosing a back-end node to process a request is not integrated with the round robin/least requests selection technique illustrated in FIGS. 3, 4A, 4B. In some embodiments, a similar probabilistic distribution-based technique may be applied in combination with the least requests selection technique to select a back-end node to process the request.

Figure 6A:
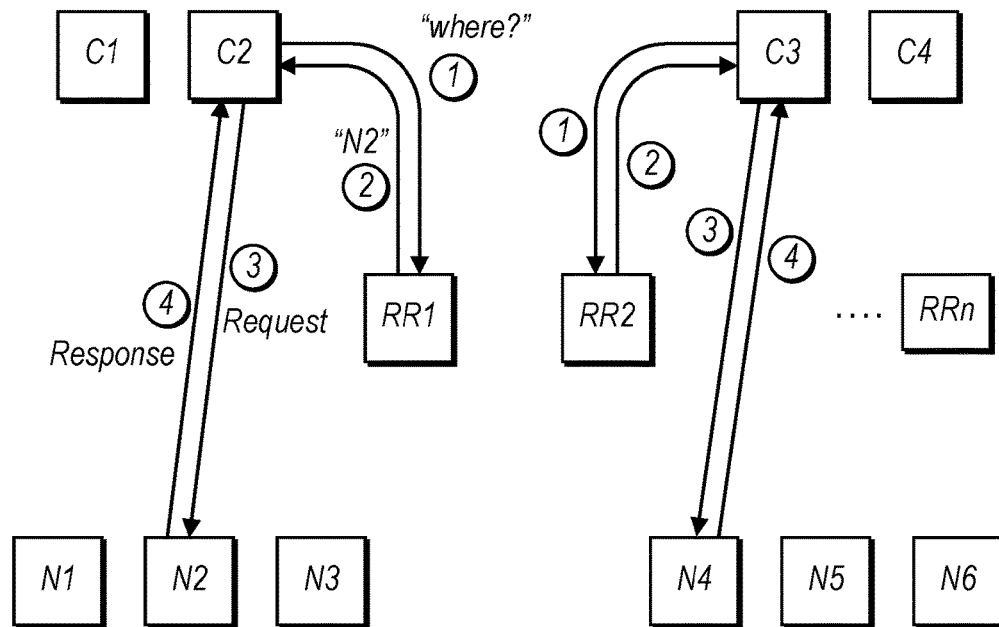
FIG. 6A is a data flow diagram for a system that implements statistical approaches to request routing, according to at least some embodiments.
Figure 6B:
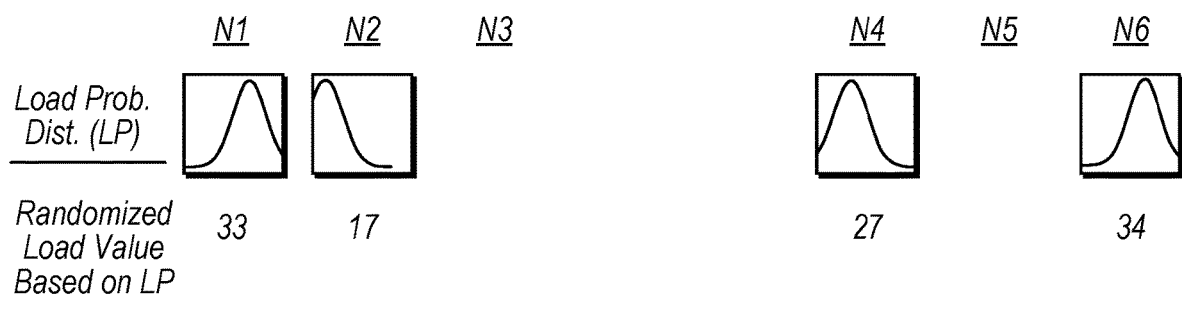
FIG. 6B is a table of data for a system that implements statistical approaches to request routing, according to at least some embodiments.

Related to FIG. 5, FIG. 6A is a data flow diagram for a system that implements a statistical approach to request routing, according to at least some embodiments and FIG. 6B is a table of data for a system that implements a statistical approach to request routing, according to at least some embodiments.

At block 502, an indication of a request to be routed for a client is received. FIG. 6A, ("1"). For example, a process request itself may be received (proxy-based routing) or a routing request, separate from the request to be processed may be received by the request router (non-proxy based). At block 504, a group of nodes is selected from among the nodes available to the request router. For example, request router RR1 in FIG. 6B selects the group of back-end nodes N1 and N2.

In some embodiments, the selection of the group may be random. For an example when the group is two, instead of making the absolute best choice using incomplete or inaccurate data (selection of the worst back-end node may be possible here), with "power of two choices" the router picks two back-end nodes at random and chooses the better option of the two based on the load probability distribution, avoiding the worse choice from the overall selection of available back-end nodes. Group membership may be larger than two, in embodiments. Group members may be selected based on other criteria, such as, but not limited to load-level, membership in a partition, network distance between the client and back-end node, existing open connections between the client and back-end nodes, etc. Such information may be exchanged between the request routers, in embodiments, illustrated in FIG. 10, described below.

At block 506 a load probability distribution is determined for each node in the group. (e.g., a gaussian or normal distribution). Example factors for determining and updating the load probability distribution may include, but are not limited to, metadata included in the indication of the request (or other traits of the request), or the result of analysis or tracking of such metadata, such as a volatility of load reported by the corresponding back-end node, a load history for the corresponding back-end node, latency of received load reports for the corresponding back-end node, or a period of time between received load reports for the corresponding back-end node, etc. Factors may be weighted, in embodiments. Example probability distributions are illustrated in FIG. 6B for N1, N2, N4 and N6.

For each back-end node in the group, a randomized load value is determined according to that nodes load probability distribution (block 508). For example, randomized load values 33 and 17 are illustrated on the left side of FIG. 6B. At block 510, request router RR1 may choose the node in the group with the least value for the determined randomized load values for the group (e.g., 17 is the least value, so node N2 is chosen). The back-end node chosen to receive the request is indicated (block 512). For example, in FIG. 6A, RR1 responds ("2") to request ("1") with an indication of back-end node 2 ("N2"). In some embodiments, the request router may send the request from ("1") directly to the selected back-end node (here, "N2").

The right-hand side of FIG. 6B illustrates a similar process for request router RR2, but nodes N4 and N6 are selected as the group (group sizes may be larger, in embodiments), and back-end node N4 is selected for having a lesser randomized load value.

In embodiments, a type of request can be associated with a type of back-end node. Various systems may determine load probability distributions based on traits or characteristics of the requests or of the back-end nodes that process the respective requests, or based on some combination thereof. In some embodiments, the system may determine load probability distributions based on a type of back-end node (e.g., a type of host). Other groupings are contemplated. For example, the system may be configured with soft partitions that are groupings of back-end nodes within a fleet (each member host or back-end node of a soft partition assigned to a request router, for example). In embodiments, the back-end nodes in a particular soft partition may be assigned to process specific request types, even though any individual soft partition may include hosts or back-end nodes of different types (e.g., a soft partition may include different types of hosts or back-end nodes, as the grouping in the soft partition is based on request type, instead of node type).

Also, in at least some embodiments, instead of calculating the actual load probability distribution for each individual back-end node, a load probability distribution that is representative of a type of request (e.g., type determined by a trait or characteristic of the request as described above, the type of work requested, such as browsing work, or batch work, or the like) or representative of a type of back-end node, or representative of a type of work performed by a back-end node may be applied. For example, requests may be grouped by request type (e.g., based on any of various characteristics or traits of the request, such as but not limited to traits of the request such as network locality of the client to a back-end node (or partition), the client identity, the API used to make the request, the building housing the device that is the source of the request, regional information about the source of the request, the type of client making the request, and which back-end node(s) the client already has open connection(s) with, etc.). A load probability associated with that particular type (or class) of request may be determined and then applied to other requests of the same type. In embodiments, a load probability associated with a particular type (or class) of back-end node may be determined based on traits or characteristics of that type of back-end node, and then applied to other back-end nodes of the same type or class, without actually measuring the traits or characteristics of the other nodes of the same type or class.

In embodiments, a system may track a few types of work being performed and determine probability distributions of each type of work and apply the distributions to incoming requests that are of the same type of work. In some embodiments, the probability distribution may be different for each back-end node. In embodiments the probability distribution may be a sum of the probability distributions of each individual type of request for the back-end node. In embodiments the probability distribution may be a sum of the probability distributions of each individual type of request for the back-end node since the last load report. Template probability distributions for particular types or classes of requests or particular types or classes of back-end node, may be used as part of the logic in the routing determinations made by the request routers.

FIG. 7A is a data flow diagram for performance information reports for a system that implements statistical approaches to request routing, in at least some embodiments, and related FIG. 7B is a process flow diagram for updating load information for a system that implements statistical approaches to request routing, in at least some embodiments. The load estimates generated in response to a performance report may be different than load estimates performed in response to routing requests, in embodiments. For example, the load estimates illustrated in FIG. 7B are for a time of load reported in the performance reports (in order to determine an error between the estimated load and the reported load), whereas load estimates generated in response to routing requests are generated as estimates of the load nearer to the time that the routing request is received.

The information from the performance reports may be processed and used by request routers described herein in the routing techniques described herein. Information received in a performance report may include, but is not limited to, the back-end node load (e.g., an outstanding request count at the back-end node), CPU and/or memory metrics, other data described herein that is used to make routing decisions, and the like.

In embodiments, when a load report is received and processed, the request router may, generate, based on a time indicated in the report, an estimate of the load for that back-end node at the time in the report and compare the load reported in the back-end node report to the request routers generated estimate of that back-end nodes load, and for each back-end node, store or maintain a running average of the absolute value of the difference between those two (e.g., using an exponentially weighted moving average, or the like, etc.).

For instance, a load report is received from a back-end node that includes a reported load at a time (block 702). In FIG. 7A request router RR1 is illustrated as receiving a load information report from back-end nodes N1 and N2, for example. An estimate of the load for the reported time is generated, and an amount of error between the estimated load and the reported load is determined (block 704). The error value associated with the load estimates for that node is updated (e.g., root mean squared error, or start with absolute value of latest error and apply to weighted average to determine running weighted average for error, or the like) based on the determined amount of error (block 706).

In embodiments, there may be two different estimated loads, one calculated when a report is received to determine error, the other calculated each time a request indication is received to be used with that error to make routing decision, asynchronous from the routing requests.

For example, the error value used in the technique selection illustrated in FIG. 3, block 308 is updated based on the amount of error determined in block 706 of FIG. 7B, in embodiments. In some embodiments, other load information for the node may be updated based on the load information reports (block 708) (e.g., other information described herein and used for making routing decisions). Non-exhaustive examples of the other updated information could be the last reported load, a running weighted average of the node load, various different updates to the variability of the load metrics, etc.

For embodiments where a probability distribution is also used as part of the selection technique, the probability distribution may be updated, based on the received load, volatility, report latency, or other information included in or about, the load report (block 710). Block 710 may not be performed if a load probability distribution is not being maintained for the back-end node, in embodiments.

Figure 8:
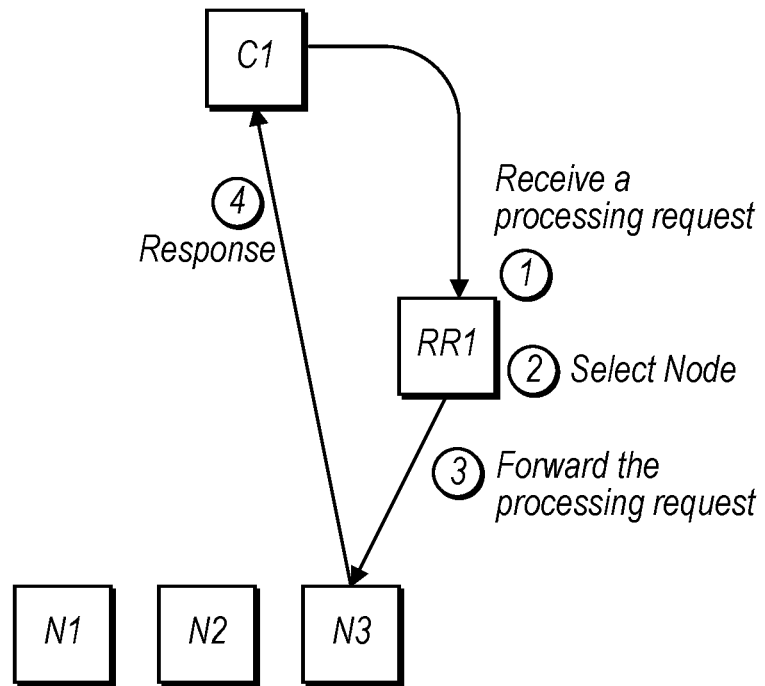
FIG. 8 is a data flow diagram for another architecture of a system that implements statistical approaches to request routing, according to at least some embodiments.

FIG. 8 illustrates an architecture with non-proxying request routers employing direct server return (DSR). In such a system, responses from back-end nodes may bypass the request routers due to DSR. In embodiments, such a system may have a problem of not being able to accurately track the number of outstanding requests at each back-end node (since the response to the requests go directly back to the client without passing through the request router, for example). The techniques disclosed herein may be useful in either or both of non-proxying or proxy-bases systems. It is contemplated that at least some architectures implemented with non-proxying request routers may not employ DSR, and the responses to the request from the back-end nodes may flow through the request routers as well.

At ("1") a processing request from client C1 is received for routing at request router RR1. At ("2") RR1 selects, from the available back-end nodes N1-N3 a node to process the request. At ("3") RR1 sends the processing request to the selected back-end node N3, that processes the request and responds, at ("4") to the client C1.

Various alternative embodiments are contemplated. A proxy may be separate and distinct from the request router, in embodiments (e.g., located at the client, or separate and distinct from the client as well, in embodiments).

Figure 9:
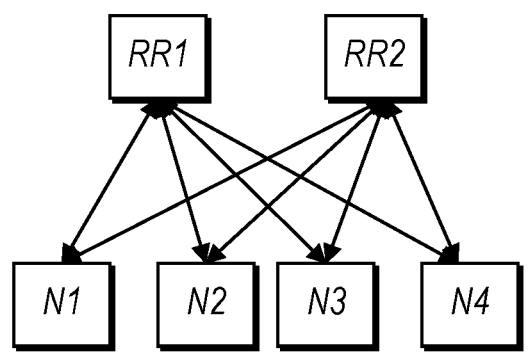
FIG. 9 is a block diagram of another architecture for a system that implements statistical approaches to request routing, in at least some embodiments.

FIG. 9 is a block diagram of another architecture for a system that implements statistical approaches to request routing, in at least some embodiments. In the illustrated embodiment, the back-end nodes N1-N4 are not partitioned among the routers. Instead, each of the routers RR1, RR2 route requests to (and receive load reports from, in embodiments) each of the nodes N1-N4.

Figure 10A:
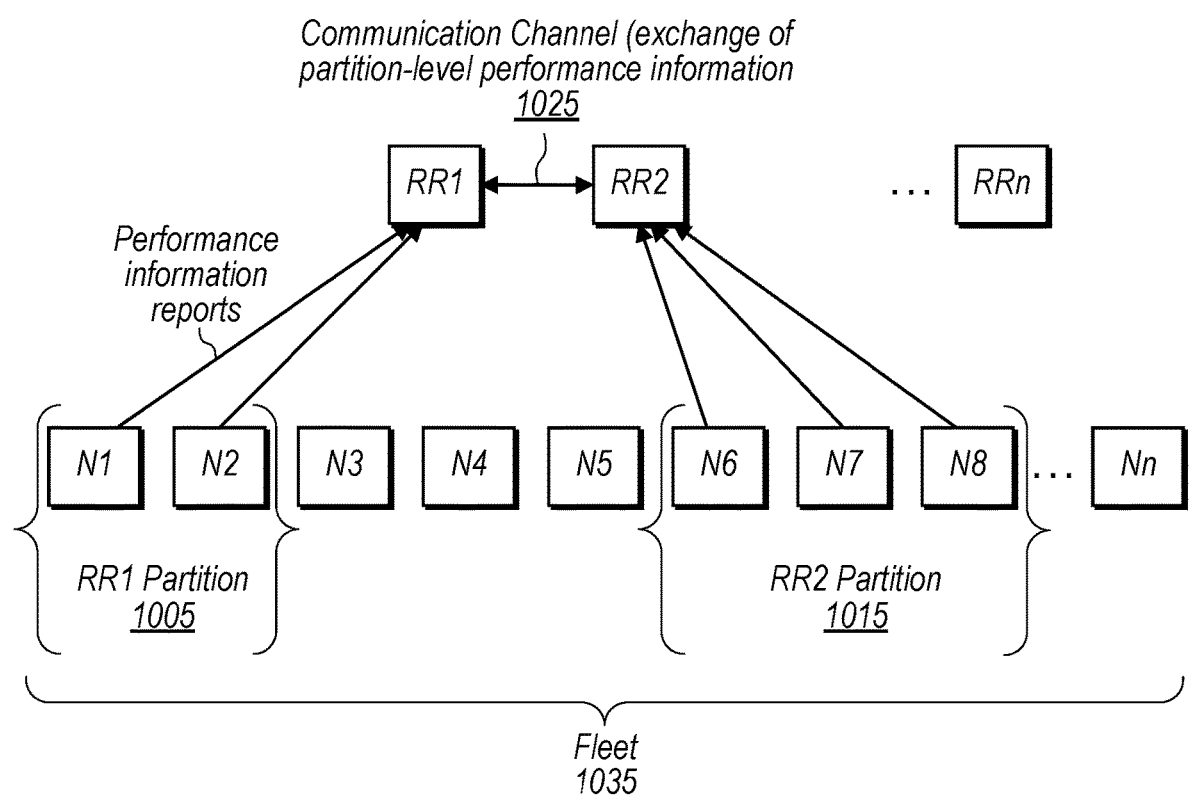
FIG. 10A is a data flow diagram of load information for a particular architecture of a system that implements statistical approaches to request routing, according to at least some embodiments.
Figure 10B:
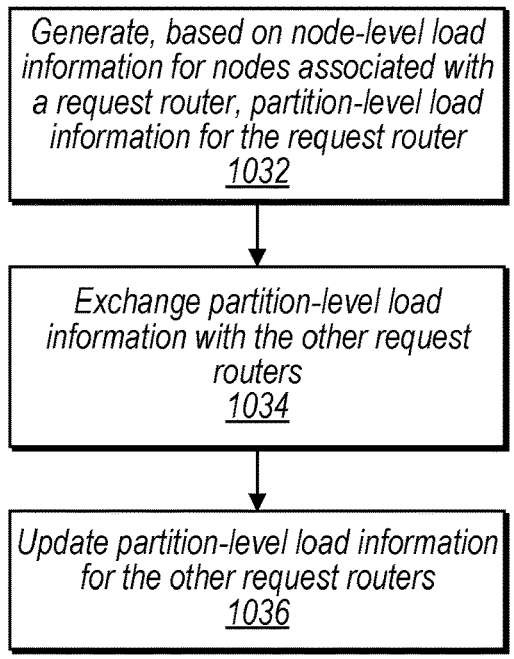
FIG. 10B is a process flow diagram of load information report processing in a system that implements statistical approaches to request routing, in at least some embodiments.

FIG. 10A is a data flow diagram of load information for a particular architecture of a system that implements statistical approaches to request routing, according to at least some embodiments. Related FIG. 10B is a process flow diagram of load information report processing in a system that implements statistical approaches to request routing, in at least some embodiments. In FIG. 10A, a fleet of back-end nodes N1-Nn are partitioned into partitions 1005 and 1015 that are each assigned to individual routers RR1 and RR2. FIG. 10A illustrates that load reports are transmitted from the back-end nodes assigned the partition to respective request routers. The reports are sent asynchronously from request handling aspects, in embodiments.

At block 1032 of FIG. 10B, partition-level load information is generated, based on the back-end node-level load information received via data contained in the load reports (and generated based on node-level information determined based on the data contained in the reports, in embodiments). For example, request router RR1 may generate the partition-level load information. At block 1034, the partition-level load information is exchanged with other request routers (e.g., RR2 . . . RRn in FIG. 10A). The request routers update partition-level load information for the other request routers (block 1036) based on the exchanged partition-level load information, in embodiments.

Figure 10C:
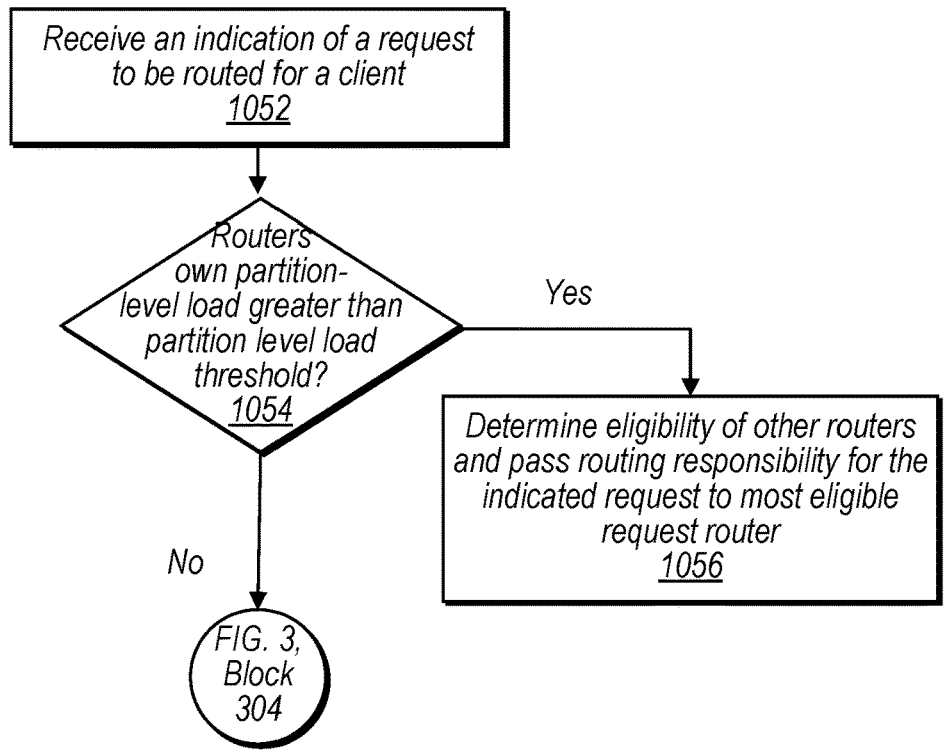
FIG. 10C is a process flow diagram of a technique for making routing decisions in a system that implements statistical approaches to request routing, in at least some embodiments.

FIG. 10C is a process flow diagram of a technique for making routing decisions based on the partition-level information in a system that implements statistical approaches to request routing, in at least some embodiments. At 1052, an indication of a request to be routed for a client is received (e.g., ("1") in FIG. 8 or FIG. 2). The request router determined whether the router's own partition-level load is greater than a partition level load threshold (block 1054) (e.g., based on the updated partition-level load information for the other request routers described in block 1036). If the load is greater (block 1054, yes) an eligibility of the other routers is determined and routing responsibility for the indicated request is passed to the most eligible request router (block 1056). Otherwise (block 1054, no) the process continues at the local request router as in block 304 of FIG. 3, etc.

Decisions may be made, by the system, in different sequences than those illustrated. In embodiments, local decisions (e.g., blocks 304/306, etc.) may be made prior to decisions based on partition-level information (e.g., block 1054), for example. For example, logic in the router may make a local decision, then determine if estimates of the other nodes associated with another router would be a better choice for processing the request. If so, the local router may send the local router's local decision to the other router, and the other router then either replies to the client with the other router's own backend node to use or, if the other router doesn't have a better reply than the local router's local decision, the other router sends the local router's decision to the client.

Figure 11:
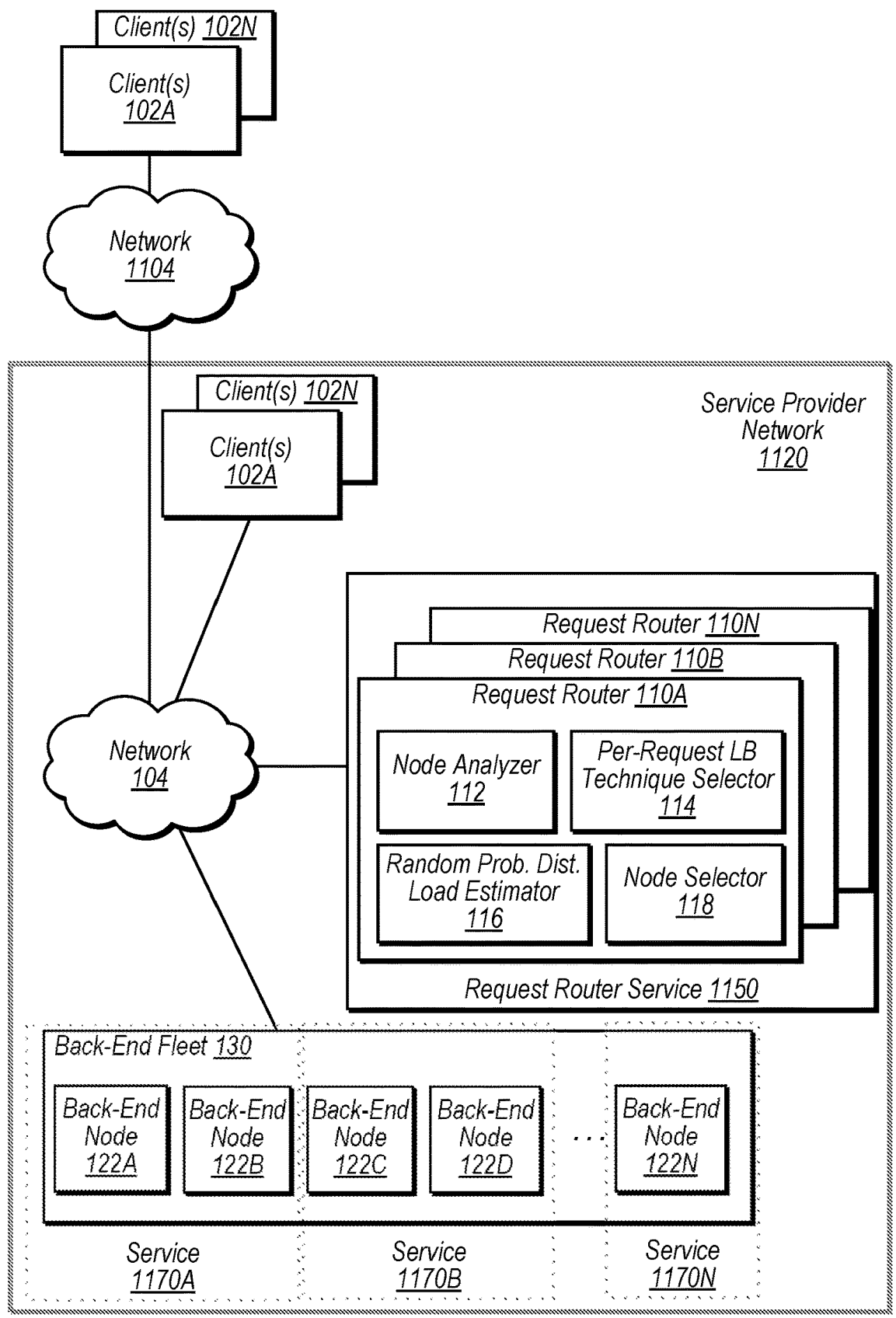
FIG. 11 is a block diagram of a service-provider architecture for a system that implements statistical approaches to request routing, in at least some embodiments.

FIG. 11 is a block diagram of a service-provider architecture for a system that implements statistical approaches to request routing, in at least some embodiments.

Service provider network 104 connects external network 1104 (connected to external clients 102A-102N), internal clients 102A-102N, request router service 1150 and back-end fleet 130 that implements services 1170A-1170N. Clients 102A-102N may include client devices, processes, applications, processes of other service providers, etc.

Request routers 110A-N are illustrated, as part of request router service 1150, with node analyzer 112, pre-request routing technique selector 114, random probability distribution load estimator 116 and back-end node selector 118. In embodiments, node analyzer 112 may analyze load information received from the back-end nodes in the form of load reports, illustrated in FIGS. 7A-B and 10A-C. Per-request routing technique selector 114 may determine, for respective routing requests, a particular routing technique to apply (e.g., FIGS. 3, 4A-B) and back-end node selector 118 may apply a particular technique to select a particular back-end node to process the request (e.g., FIGS. 3, 4A-B, 5, 6A-B).

Services 1170A-N may include some combination of higher-level and lower-level services, the higher-level services being dependent upon some of the lower-level services, in embodiments. At least some of the higher-level services may be provided to external, and/or internal clients. In some embodiment, higher-level services may act as clients of the lower-level services. Any of the services of the service provider may rely upon the request routers services for routing requests to others of the multiple services provided by the service provider network, in embodiments. For example, a request routed by request router 110B may be processed by back-end node 122B of service 1170A. Service 1170A may in turn send a request to request router service 1150 requesting routing of other requests triggered by the request routed by request router 110B and processed by back-end node 122B. Request router service 1150 may in turn route those triggered requests to other services of services 1170A-1170N, in embodiments.

In some embodiments, routing requests (and/or processing requests) may originate from external clients 102A-102N (client devices, processes, applications, processes of other service providers, etc.).

Illustrative System

Figure 12:
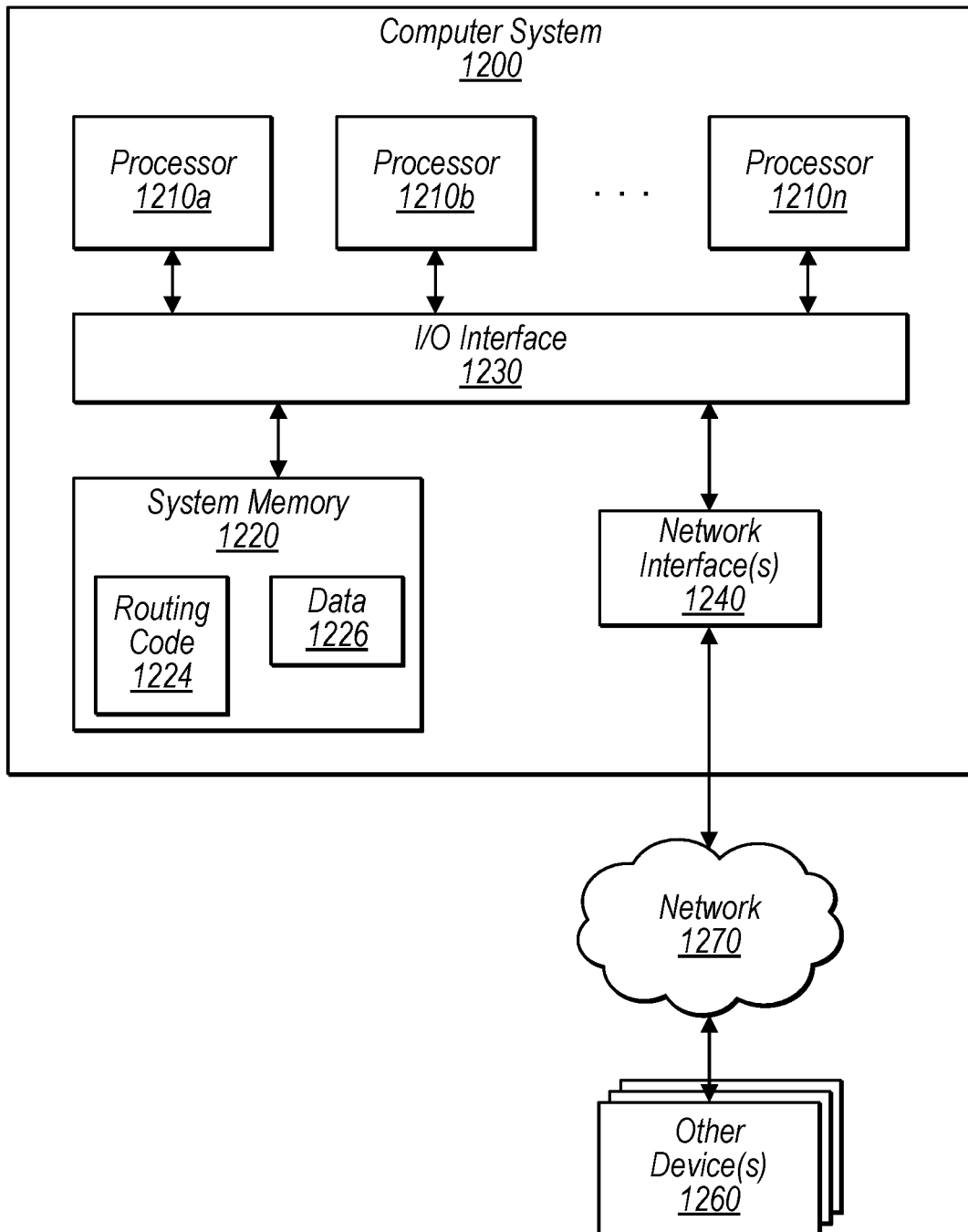
FIG. 12 is a block diagram illustrating an example computer system that may be used in some embodiments of a system that implements statistical approaches to request routing.

FIG. 12 is a block diagram illustrating an example computer system that may be used in some embodiments of a system that implements statistical approaches to request routing. In at least some embodiments, a request router that implements a portion or all of the statistical approach to request routing methods and apparatus as described herein may include a general-purpose computer system that includes or is configured to access one or more computer-accessible media, such as computer system 1200 illustrated in FIG. 12. Clients and back-end nodes may also be implemented by the example computer system, in embodiments.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the statistical approach to request routing methods and apparatus, are shown stored within system memory 1220 as code 1224 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1460 attached to a network or networks 1450, such as other computer systems or devices as illustrated in FIGS. 1 through 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIGS. 1 through 11 for implementing embodiments of network devices such as a request routers or back-end node systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Embodiments of the disclosure can be described in view of the following clauses.

Clause 1. A system, comprising a plurality of computers configured to host a plurality of back-end nodes to process requests from a plurality of clients; and a plurality of computers configured to host a plurality of request routers, wherein individual ones of the plurality of request routers are configured to: receive an indication of a request to be routed for a client of the plurality of clients; determine, for each back-end node of a group of the plurality of back-end nodes, an estimated current load and a corresponding error of the estimated current load; determine, based on the determined estimated current load and corresponding error for each back-end node of the group, whether to apply a least load technique or a round robin technique to select one of the back-end nodes from the group to receive the request; apply the determined technique to choose one of the back-end nodes from the group; and indicate the back-end node chosen to receive the request.

Clause 2. The system of clause 1, wherein to determine whether to apply the least load technique or the round robin technique, the individual ones of the plurality of request routers are further configured to: determine a difference between the respective determined estimated loads for a first back-end node of the group and a second back-end node of the group; determine an error threshold based on the determined corresponding errors for the respective determined estimated loads for a first back-end node of the group and a second back-end node; determine to apply the round robin technique when the determined difference between the respective determined estimated loads for the first back-end node and the second back-end node is less than the determined error threshold; and determine to apply the least load technique when the determined difference between the respective determined estimated loads is greater than the error threshold.

Clause 3. The system of clauses 1 to 2, wherein the individual ones of the plurality of request routers are further configured to: receive, from back-end nodes assigned to the respective routers, individual performance reports each comprising a reported load at a reported time for the individual back-end node of the assigned back-end nodes; for each received performance report of the received individual performance reports: generate an estimated load for the respective back-end node for the reported time and determine a difference between the estimated load and the reported load; and update, based on the determined difference, the error corresponding to estimating load for the individual back-end node of the assigned back-end nodes.

Clause 4. The system of clauses 1 to 3, wherein the error corresponding to estimating load for the individual back-end node is updated according to a weighted running average of absolute values of differences between reported loads and corresponding estimated loads for the individual back-end node.

Clause 5. The system of clauses 1 to 4, wherein: the plurality of request routers is part of a fleet of request routers for a particular service of a service provider network that provides multiple services that interact with one another; and wherein the plurality of clients include one or more of the multiple services that send requests to the particular service.

Clause 6. A method, comprising: performing, by a request router: receiving an indication of a request to be routed for a client; determining, for each back-end node of a group of back-end nodes, an estimated current load and a corresponding error of the estimated current load; selecting, based on the determined estimated current load and corresponding error for each back-end node of the group, a technique from among multiple load balancing techniques to apply to choose one of the back-end nodes from the group to receive the request; applying the selected technique to choose one of the back-end nodes from the group; and indicating the back-end node chosen to receive the request.

Clause 7. The method of clause 6, wherein: said receiving the indication of the request to be routed for the client comprises receiving a routing request from the client; and said indicating the back-end node chosen to receive the request comprises responding to the client with the indication of the back-end node chosen to receive the request to instruct the client to route the request to the chosen back-end node.

Clause 8. The method of clauses 6, wherein: said receiving the indication of the request to be routed for the client comprises receiving the request from the client; and said indicating the back-end node chosen to receive the request comprises sending, by the request router, the request to the chosen back-end node for the chosen back-end node to process the request and send a response for the request to the client.

Clause 9. The method of clauses 6 to 8, further comprising: receiving, from the back-end nodes, respective performance reports each comprising a reported load at a reported time for the respective back-end node; for each received performance report of the respective performance reports: generating an estimated load for the respective back-end node for the reported time and determining a difference between the estimated load and the reported load; updating, based on the determined difference, the error corresponding to estimating load for the respective back-end node; and updating, based on data in the performance report, other load information for the respective back-end node.

Clause 10. The method of clauses 6 to 9, wherein the request router is one of a plurality of request routers each assigned to a respective partition of a plurality of back-end nodes; and wherein the method further comprises selecting, prior to said determining the estimated current load, the group of back-end nodes from the respective partition of back-end nodes assigned to the request router.

Clause 11. The method of clauses 6 to 10, wherein: the request router is one of a plurality of request routers; respective ones of the plurality of request routers are individually assigned respective partitions of back-end nodes; and the method further comprises: generating, by individual ones of the plurality of request routers, based on node-level load information for the respective partitions of back-end nodes, respective partition-level load information; exchanging, over one or more communication channels between the plurality of request routers, the partition-level load information for the plurality of request routers; and updating, by the plurality of request routers, partition-level load information for the other ones of the plurality of request routers based on respective partition-level load information received from the ones of the plurality of request routers from said exchanging.

Clause 12. The method of clauses 6 to 11, the method further comprising: receiving, by the request router, an indication of another request to be routed; determining, by the request router responsive to receiving the indication of the other request, that the request router's partition-level load is greater than a partition-level load threshold; selecting, from among others of the plurality of request routers and based on the respective partition-level load information for the others of the plurality of request routers, one of the others of the plurality of request routers to which to redirect the indication of the other request; receiving, by the selected request router, the redirected indication of the other request to be routed; determining, by the selected request router, for another group of back-end nodes selected from a partition of back-end nodes assigned to the selected request router, a respective estimated current load for each of the back-end nodes in the other group and a corresponding error of the estimated current load; selecting, by the selected request router, based on the determined respective estimated current load and respective error for each back-end node of the other group, a technique from among multiple load balancing techniques to apply to choose one of the back-end nodes from the other group; applying, by the selected request router, the selected technique to choose one of the back-end nodes from the other group; and indicating the back-end node chosen to receive the other request.

Clause 13. The method of clauses 6-11, further comprising: receiving, by the request router, an indication of another request to be routed; determining, by the request router based at least in part on the given request router's partition-level load being less than a partition-level load threshold, to process the indication locally; determining, by the request router, for another group of back-end nodes selected from the partition assigned to the request router, a respective estimated current load for each of the back-end nodes in the other group and a corresponding error of the estimated current load; selecting, by the request router, based on the determined respective estimated current load and respective error for each back-end node of the other group, a technique from among multiple load balancing techniques to apply to choose one of the back-end nodes from the other group; applying the selected technique to choose one of the back-end nodes from the other group; and indicating the back-end node chosen to receive the other request.

Clause 14. The method of clauses 6 to 13, wherein: said selecting the technique to apply comprises selecting a least load technique; and said applying the selected technique comprises applying the least load technique which comprises: determining, for each back-end node of the group of the back-end nodes: a respective load probability distribution, and a respective randomized load value randomized according to the respective load probability distribution; and choosing, from the group of back-end nodes, a back-end node with a least value of the respective randomized load values of the group.

Clause 15. One or more non-transitory computer readable storage media storing program instructions that are executable on or across one or more processors to implement a request router configured to perform: determining for a group of back-end nodes, in response to receipt of an indication of a request to be routed for a client, an estimated current load for each of the back-end nodes in the group and a corresponding error of the estimated current load; selecting, based on a respective estimated current load and respective error for each back-end node of the group, a technique from among multiple load balancing techniques to apply to choose one of the back-end nodes from the group; applying the selected technique to choose one of the back-end nodes from the group; and indicating the back-end node chosen to receive the request.

Clause 16. The one or more non-transitory computer readable storage media of clause 15, wherein: said determining the estimated current load is based at least in part on one or more factors comprising at least one of: a number of new requests the request router has sent to the back-end node since the last report, metadata included in the indication of the request, or an amount of time passed since the request count was reported.

Clause 17. The one or more non-transitory computer readable storage media of clauses 15 to 16, wherein: the indication of the request to be routed for the client comprises a request from the client to be processed by a back-end node; and said indicating the back-end node chosen to receive the request the router comprises sending, by the request router, the request to the chosen back-end node to process the request and send a response for the request to the client.

Clause 18. The one or more non-transitory computer readable storage media of clauses 15 to 17, wherein: said selecting the technique to apply comprises selecting a least load technique; and said applying the selected technique comprises applying the least load technique which comprises: determining, for back-end node of the group of the back-end nodes: respective load probability distribution, and a respective randomized load value randomized according to the respective load probability distribution; and choosing, from the group of back-end nodes, a back-end node with a least value of the respective randomized load values of the group.

Clause 19. The one or more non-transitory computer readable storage media of clauses 15 to 18, wherein: the request router is one of a plurality of request routers; respective ones of the plurality of request routers are individually assigned respective partitions of back-end nodes; and the request router is further configured to perform: generating, by individual ones of the plurality of request routers, based on node-level load information for the respective partitions of back-end nodes, respective partition-level load information; exchanging, over one or more communication channels between the plurality of request routers, the partition-level load information for the plurality of request routers; and updating partition-level load information for the other ones of the plurality of request routers based on respective partition-level load information received from the ones of the plurality of request routers from said exchanging.

Clause 20. The one or more non-transitory computer readable storage media of clause 19, wherein the request router is further configured to perform: receiving, by the request router, an indication of another request to be routed determining, by the request router, responsive to receiving the indication of the other request, that the request router's partition-level load is greater than a partition-level load threshold; selecting, from among others of the plurality of request routers and based on the respective partition-level load information for the others of the plurality of request routers, one of the others of the plurality of request routers to which to redirect the indication of the other request; receiving, by the selected request router, the redirected indication of the other request to be routed; determining, by the selected request router, for another group of back-end nodes selected from a partition of back-end nodes assigned to the selected request router, a respective estimated current load for each of the back-end nodes in the other group and a corresponding error of the estimated current load; selecting, by the selected request router, based on the determined respective estimated current load and respective error for each back-end node of the other group, a technique from among multiple load balancing techniques to apply to choose one of the back-end nodes from the other group; applying, by the selected request router, the selected technique to choose one of the back-end nodes from the other group; and indicating the back-end node chosen to receive the other request.

Clause 21. A system, comprising: a plurality of computers configured to host a plurality of back-end nodes to process requests from a plurality of clients; and a plurality of computers configured to host a plurality of request routers, wherein individual ones of the plurality of request routers are configured to: receive an indication of a request to be routed for a client of the plurality of clients; determine, for each back-end node of a group of the plurality of back-end nodes: a respective load probability distribution, and a respective randomized load value randomized according to the respective load probability distribution; choose, from the group of back-end nodes, a back-end node with the least value of the determined randomized load values for the group; and indicate the chosen back-end node to receive the request.

Clause 22. The system of clause 21, wherein the individual ones of the plurality of request routers are further configured to: receive, from back-end nodes assigned to the respective request routers, respective load reports for the respective back-end nodes assigned to the respective request router; update, based on the received load reports, the respective load probability distributions for the respective back-end nodes assigned to the respective request router.

Clause 23. The system of clauses 22 to 22, wherein to determine the respective load probability distributions, individual ones of the request routers determine the respective load probability distribution based on one or more factors, comprising at least one of: requests that have been sent subsequent to the last report, characteristics of requests sent subsequent to the last report, latency of the received performance reports, a period of time between the reports, the reported load values, an error in estimated load values, or variance in the load values over time.

Clause 24. The system of clauses 21 to 23, wherein: the received indication of the request comprises a routing request from the client; and to indicate the chosen back-end node to receive the request the individual ones of the plurality of request routers are further configured to respond to the client with the indication of the chosen back-end node to receive the request to instruct the client to route the request to the chosen back-end node.

Clause 25. The system of clauses 21 to 24, wherein: the plurality of request routers is part of a fleet of request routers for a particular service of a service provider network that provides multiple services that interact with one another; and wherein the plurality of clients include one or more of the multiple services that send requests to the particular service.

Clause 26. A computer-implemented method, comprising: performing, by a request router that routes requests from one or more clients to a plurality of back-end nodes: receiving an indication of a request to be routed for a client of the one or more clients; determining, for each back-end node of a group of the plurality of back-end nodes: a respective load probability distribution, and a respective randomized load value randomized according to the respective load probability distribution; choosing, from the group of back-end nodes, a back-end node with a least value of the determined randomized load values for the group; and indicating the chosen back-end node to receive the request.

Clause 27. The computer-implemented method of clause 26, further comprising: receiving, at the request router from the back-end nodes, respective load reports for the individual back-end nodes; and updating, at the request router based on the received load reports, the respective load probability distributions for the individual back-end nodes.

Clause 28. The computer-implemented method of clause 27, wherein said determining the respective load probability distribution is based on one or more factors, comprising at least one of: a volatility of load reported by the corresponding back-end node, a load history for the corresponding back-end node, latency of received load reports for the corresponding back-end node, or a period of time between received load reports for the corresponding back-end node.

Clause 29. The computer-implemented method of clauses 27 to 28, wherein individual ones of the respective load reports are associated, by respective request routers, with an expected load report time; and wherein said updating the respective load probability distributions is based at least in part on one or more factors, comprising at least one of: data from the respective load report comprising load at the respective back-end node, or information about the load report comprising load report latency.

Clause 30. The computer-implemented method of clauses 26 to 29, wherein: the indication of the request comprises a routing request from the client; and said indicating the chosen back-end node comprises responding to the client with the indication of the back-end node chosen to receive the request to instruct the client to route the request to the chosen back-end node.

Clause 31. The computer-implemented method of clauses 26 to 29, wherein: the indication of the request comprises the request from the client to be processed by one of the back-end nodes; and said indicating the chosen back-end node comprises sending, by the request router, the request to the chosen back-end node for the back-end node to process the request and send a response for the request to the client.

Clause 32. The computer-implemented method of clauses 26 to 31, wherein: the request router is part of a fleet of request routers for a particular service of a service provider network that provides multiple services that interact with one another; and wherein the one or more clients include one or more of the multiple services that send requests to the particular service.

Clause 33. The computer-implemented method of clauses 26 to 32, wherein the request router is one of a plurality of request routers each assigned to a respective partition of a plurality of back end nodes; and wherein the method further comprises selecting, prior to said determining the respective load probability distribution, the group of back-end nodes from the respective partition of back-end nodes assigned to the request router.

Clause 34. One or more non-transitory computer readable storage media storing programs executable on or across one or more processors to implement a request router configured to perform: receiving an indication of a request to be routed for a client of one or more clients; determining, for each back-end node of a group of a plurality of back-end nodes: a respective load probability distribution, and a respective randomized load value randomized according to the respective load probability distribution; choosing, from the group of back-end nodes, a back-end node with a least value of the determined randomized load values for the group; and indicating the chosen back-end node to receive the request.

Clause 35. The one or more non-transitory computer readable storage media of clause 34 wherein: a partition of the plurality of back-end nodes is assigned to the request router; and the request router is further configured to perform: receiving, from individual ones of the assigned back-end nodes, respective performance reports; and updating, based on individual ones of the received performance reports, the respective load probability distribution corresponding the back-end node described in the report.

Clause 36. The one or more non-transitory computer readable storage media of clauses 34 to 35, wherein said determining the respective load probability distribution is based on one or more factors comprising at least one of: requests that have been sent subsequent to the last report, characteristics of requests sent subsequent to the last report, latency of the received performance reports, the reported load values, an error in estimated load values, or variance in the reported load values over time.

Clause 37. The one or more non-transitory computer readable storage media of clauses 34-36, wherein the request router is one of a plurality of request routers for a particular service of a service provider network that provides multiple services that interact with one another; and wherein the plurality of clients includes one or more of the multiple services that send requests to the particular service.

Clause 38. The one or more non-transitory computer readable storage media of clauses 34 to 37, wherein: the request router is one of a plurality of request routers; respective ones of the plurality of request routers are individually assigned respective partitions of back-end nodes; and the request router is further configured to perform: generating, by individual ones of the plurality of request routers, based on node-level load information for the respective partitions of back-end nodes, respective partition-level load information; and exchanging, over one or more communication channels between the plurality of request routers, the partition-level load information; and updating partition-level load information for the other ones of the plurality of request routers based on respective partition-level load information received from the ones of the plurality of request routers from said exchanging.

Clause 39. The one or more non-transitory computer readable storage media of clause 38, wherein the request router is further configured to perform: receiving an indication of another request to be routed; determining, responsive to receiving the indication of the other request, that the request router's partition-level load is greater than a partition-level load threshold; and selecting, from among others of the plurality of request routers and based on the respective partition-level load information for the others of the plurality of request routers, one of the others of the plurality of request routers to which to redirect the indication of the other request; and redirecting the indication of the other request to the selected request router.

Clause 40. The one or more non-transitory computer readable storage media of clauses 38 to 39, wherein the request router is further configured to perform: receiving an indication of another request to be routed; determining, responsive to receiving the indication of the other request, that the request router's partition-level load is less than a partition-level load threshold; determining, for each back-end node of another group of the plurality of back-end nodes: a respective load probability distribution, and another respective randomized load value randomized according to the respective load probability distribution; choosing, from the other group of back-end nodes, a back-end node with a least value of the determined randomized load values for the other group; and indicating the chosen back-end node of the other group to receive the other request.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computers configured to host a plurality of back-end nodes to process requests from a plurality of clients; and
a plurality of computers configured to host a plurality of request routers, wherein individual ones of the plurality of request routers are configured to:
receive an indication of a request to be routed for a client of the plurality of clients;
determine, for individual back-end nodes of a group of the plurality of back-end nodes, an estimated current load and a corresponding error of the estimated current load;
determine, based on the determined estimated current load and corresponding error for individual back-end nodes of the group, whether to apply a least load technique or a round robin technique to select one of the back-end nodes from the group to receive the request;
apply the determined technique to choose one of the back-end nodes from the group; and
indicate the back-end node chosen to receive the request.

2. The system of claim 1, wherein to determine whether to apply the least load technique or the round robin technique, the individual ones of the plurality of request routers are further configured to:
determine a difference between the respective determined estimated loads for a first back-end node of the group and a second back-end node of the group;
determine an error threshold based on the determined corresponding errors for the respective determined estimated loads for a first back-end node of the group and a second back-end node;
determine to apply the round robin technique when the determined difference between the respective determined estimated loads for the first back-end node and the second back-end node is less than the determined error threshold; and
determine to apply the least load technique when the determined difference between the respective determined estimated loads is greater than the error threshold.

3. The system of claim 1, wherein the individual ones of the plurality of request routers are further configured to:
receive, from back-end nodes assigned to the respective routers, individual performance reports individually comprising a reported load at a reported time for the individual back-end node of the assigned back-end nodes;
for individually received performance reports of the received individual performance reports:
generate an estimated load for the respective back-end node for the reported time and determine a difference between the estimated load and the reported load; and
update, based on the determined difference, the error corresponding to estimating load for the individual back-end node of the assigned back-end nodes.

4. The system of claim 3, wherein the error corresponding to estimating load for the individual back-end node is updated according to a weighted running average of absolute values of differences between reported loads and corresponding estimated loads for the individual back-end node.

5. The system of claim 1, wherein:
the plurality of request routers is part of a fleet of request routers for a particular service of a service provider network that provides multiple services that interact with one another; and
wherein the plurality of clients include one or more of the multiple services that send requests to the particular service.

6. A method, comprising:
performing, by a request router:
receiving an indication of a request to be routed for a client;
determining, for individual back-end node of a group of back-end nodes, an estimated current load and a corresponding error of the estimated current load;
selecting, based on the determined estimated current load and corresponding error for individual back-end nodes of the group, a technique from among multiple load balancing techniques to apply to choose one of the back-end nodes from the group to receive the request;
applying the selected technique to choose one of the back-end nodes from the group; and
indicating the back-end node chosen to receive the request.

7. The method of claim 6, wherein:
said receiving the indication of the request to be routed for the client comprises receiving a routing request from the client; and
said indicating the back-end node chosen to receive the request comprises responding to the client with the indication of the back-end node chosen to receive the request to instruct the client to route the request to the chosen back-end node.

8. The method of claim 6, wherein:
said receiving the indication of the request to be routed for the client comprises receiving the request from the client; and
said indicating the back-end node chosen to receive the request comprises sending, by the request router, the request to the chosen back-end node for the chosen back-end node to process the request and send a response for the request to the client.

9. The method of claim 6, further comprising:
receiving, from the back-end nodes, respective performance reports individually comprising a reported load at a reported time for the respective back-end node;
for individual received performance report of the respective performance reports:
generating an estimated load for the respective back-end node for the reported time and determining a difference between the estimated load and the reported load;

updating, based on the determined difference, the error corresponding to estimating load for the respective back-end node; and
updating, based on data in the performance report, other load information for the respective back-end node.

10. The method of claim 6,
wherein the request router is one of a plurality of request routers individually assigned to a respective partition of a plurality of back-end nodes; and
wherein the method further comprises selecting, prior to said determining the estimated current load, the group of back-end nodes from the respective partition of back-end nodes assigned to the request router.

11. The method of claim 6, wherein:
the request router is one of a plurality of request routers;
respective ones of the plurality of request routers are individually assigned respective partitions of back-end nodes; and
the method further comprises:
generating, by individual ones of the plurality of request routers, based on node-level load information for the respective partitions of back-end nodes, respective partition-level load information;
exchanging, over one or more communication channels between the plurality of request routers, the partition-level load information for the plurality of request routers; and
updating, by the plurality of request routers, partition-level load information for the other ones of the plurality of request routers based on respective partition-level load information received from the ones of the plurality of request routers from said exchanging.

12. The method of claim 11, the method further comprising:
receiving, by the request router, an indication of another request to be routed;
determining, by the request router responsive to receiving the indication of the other request, that the request router's partition-level load is greater than a partition-level load threshold;
selecting, from among others of the plurality of request routers and based on the respective partition-level load information for the others of the plurality of request routers, one of the others of the plurality of request routers to which to redirect the indication of the other request;
receiving, by the selected request router, the redirected indication of the other request to be routed;
determining, by the selected request router, for another group of back-end nodes selected from a partition of back-end nodes assigned to the selected request router, a respective estimated current load for individual ones of the back-end nodes in the other group and a corresponding error of the estimated current load;
selecting, by the selected request router, based on the determined respective estimated current load and respective error for individual ones of the back-end nodes of the other group, a technique from among multiple load balancing techniques to apply to choose one of the back-end nodes from the other group;
applying, by the selected request router, the selected technique to choose one of the back-end nodes from the other group; and
indicating the back-end node chosen to receive the other request.

13. The method of claim 11, further comprising:
receiving, by the request router, an indication of another request to be routed;
determining, by the request router based at least in part on the given request router's partition-level load being less than a partition-level load threshold, to process the indication locally;
determining, by the request router, for another group of back-end nodes selected from the partition assigned to the request router, a respective estimated current load for individual ones of the back-end nodes in the other group and a corresponding error of the estimated current load;
selecting, by the request router, based on the determined respective estimated current load and respective error for individual back-end nodes of the other group, a technique from among multiple load balancing techniques to apply to choose one of the back-end nodes from the other group;
applying the selected technique to choose one of the back-end nodes from the other group; and
indicating the back-end node chosen to receive the other request.

14. The method of claim 6, wherein:
said selecting the technique to apply comprises selecting a least load technique; and
said applying the selected technique comprises applying the least load technique which comprises:
determining, for individual back-end nodes of the group of the back-end nodes:
a respective load probability distribution, and
a respective randomized load value randomized according to the respective load probability distribution; and
choosing, from the group of back-end nodes, a back-end node with a least value of the respective randomized load values of the group.

15. One or more non-transitory computer readable storage media storing program instructions that are executable on or across one or more processors to implement a request router configured to perform:
determining for a group of back-end nodes, in response to receipt of an indication of a request to be routed for a client, an estimated current load for individual ones of the back-end nodes in the group and a corresponding error of the estimated current load;
selecting, based on a respective estimated current load and respective error for individual back-end nodes of the group, a technique from among multiple load balancing techniques to apply to choose one of the back-end nodes from the group;
applying the selected technique to choose one of the back-end nodes from the group; and
indicating the back-end node chosen to receive the request.

16. The one or more non-transitory computer readable storage media of claim 15, wherein:
said determining the estimated current load is based at least in part on one or more factors comprising at least one of:
a number of new requests the request router has sent to the back-end node since the last report,
metadata included in the indication of the request, or
an amount of time passed since the request count was reported.

17. The one or more non-transitory computer readable storage media of claim 15, wherein:

the indication of the request to be routed for the client comprises a request from the client to be processed by a back-end node; and said indicating the back-end node chosen to receive the request the router comprises sending, by the request router, the request to the chosen back-end node to process the request and send a response for the request to the client.

18. The one or more non-transitory computer readable storage media of claim 15, wherein:

said selecting the technique to apply comprises selecting a least load technique; and said applying the selected technique comprises applying the least load technique which comprises:

determining, for back-end node of the group of the back-end nodes:
a respective load probability distribution, and
a respective randomized load value randomized according to the respective load probability distribution; and choosing, from the group of back-end nodes, a back-end node with a least value of the respective randomized load values of the group.

19. The one or more non-transitory computer readable storage media of claim 15, wherein:

the request router is one of a plurality of request routers;

respective ones of the plurality of request routers are individually assigned respective partitions of back-end nodes; and the request router is further configured to perform:

generating, by individual ones of the plurality of request routers, based on node-level load information for the respective partitions of back-end nodes, respective partition-level load information;

exchanging, over one or more communication channels between the plurality of request routers, the partition-level load information for the plurality of request routers; and updating partition-level load information for the other ones of the plurality of request routers based on respective partition-level load information received from the ones of the plurality of request routers from said exchanging.

20. The one or more non-transitory computer readable storage media of claim 19, wherein the request router is further configured to perform:

receiving, by the request router, an indication of another request to be routed determining, by the request router, responsive to receiving the indication of the other request, that the request router's partition-level load is greater than a partition-level load threshold;

selecting, from among others of the plurality of request routers and based on the respective partition-level load information for the others of the plurality of request routers, one of the others of the plurality of request routers to which to redirect the indication of the other request;

receiving, by the selected request router, the redirected indication of the other request to be routed;

determining, by the selected request router, for another group of back-end nodes selected from a partition of back-end nodes assigned to the selected request router, a respective estimated current load for individual ones of the back-end nodes in the other group and a corresponding error of the estimated current load;

selecting, by the selected request router, based on the determined respective estimated current load and respective error for individual ones of the back-end nodes of the other group, a technique from among multiple load balancing techniques to apply to choose one of the back-end nodes from the other group;

applying, by the selected request router, the selected technique to choose one of the back-end nodes from the other group; and indicating the back-end node chosen to receive the other request.

* * * * *